(12) United States Patent  
Song (10) Patent No.: US 8,811,157 B2  
(45) Date of Patent: Aug. 19, 2014

(54) PROTECTION SWITCHING METHOD AND SYSTEM FOR ETHERNET DUAL-HOMED LINK

(75) Inventor: Xiaoli Song, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 343 days.

(21) Appl. No.: 13/258,339

(22) PCT Filed: Apr. 12, 2010

(86) PCT No.: PCT/CN2010/071705  
§ 371 (c)(1),  
(2), (4) Date: Jan. 18, 2012

(87) PCT Pub. No.: WO2011/009313  
PCT Pub. Date: Jan. 27, 2011

(65) Prior Publication Data  
US 2012/0275296 A1    Nov. 1, 2012

(30) Foreign Application Priority Data

Jul. 23, 2009 (CN) .......................... 2009 1 0089781

(51) Int. Cl.  
*H04L 12/26* (2006.01)  
*G06F 11/20* (2006.01)

(52) U.S. Cl.  
CPC ........ *H04L 43/0811* (2013.01); *G06F 11/2007* (2013.01); *H04L 43/10* (2013.01)  
USPC ........................................... 370/225

(58) Field of Classification Search  
USPC .................. 370/216, 217, 221, 225  
See application file for complete search history.

(56) References Cited

U.S. PATENT DOCUMENTS

| 6,915,445 B2 | 7/2005 | Navar et al. |
| 6,917,583 B2 | 7/2005 | Suzuki |

(Continued)

FOREIGN PATENT DOCUMENTS

| CN | 1984045 A | 6/2007 |
| CN | 101022390 A | 8/2007 |

(Continued)

OTHER PUBLICATIONS

International Search Report in international application No. PCT/CN2010/071705, mailed Jul. 22, 2010.

(Continued)

*Primary Examiner* — Mohammad Anwar  
(74) *Attorney, Agent, or Firm* — Oppedahl Patent Law Firm LLC (57) ABSTRACT

The disclosure provides a protection switching method for an Ethernet dual-homed link, which comprises: a node on one path of a dual-homed link detects that a failure occurs in a link or node which is directly connected with the node per se; when the node which detects the failure is a non-master node, the non-master node continuously transmits N failure state protocol (SF) messages outwards through a non-failed port on the failure path; after receiving the SF messages, the master node switches traffic on the failure path to an available path. The disclosure further provides another protection switching method for an Ethernet dual-homed link and a protection switching system for an Ethernet dual-homed link. By means of the disclosure, when a failure occurs in a link or node, a fast protection switching for the Ethernet dual-homed link can be realized; moreover, when the link or node recovers from the failure, a fast backward switching for the Ethernet dual-homed link can be realized as required actually.

20 Claims, 10 Drawing Sheets

(56) References Cited

U.S. PATENT DOCUMENTS

| | | | |
|---|---|---|---|
| 7,345,991 B1* | 3/2008 | Shabtay et al. | 370/221 |
| 2001/0015955 A1 | 8/2001 | Suzuki | |
| 2003/0117946 A1 | 6/2003 | Fontana et al. | |
| 2003/0212927 A1 | 11/2003 | Akyol et al. | |
| 2009/0207726 A1* | 8/2009 | Thomson et al. | 370/216 |

FOREIGN PATENT DOCUMENTS

| | | |
|---|---|---|
| CN | 101227372 A | 7/2008 |
| CN | 101272352 A | 9/2008 |
| CN | 101291204 A | 10/2008 |
| CN | 101340351 A | 1/2009 |
| EP | 1128584 A2 | 8/2001 |

OTHER PUBLICATIONS

English Translation of the Written Opinion of the International Search Authority in international applicaion No. PCT/CN2010/071705, mailed on Jul. 22, 2010.

* cited by examiner

PROTECTION SWITCHING METHOD AND SYSTEM FOR ETHERNET DUAL-HOMED LINK

TECHNICAL FIELD

The disclosure relates to a protection switching technology of an Ethernet dual-homed link, and in particular to a protection switching method and system for an Ethernet dual-homed link.

BACKGROUND

Dual-homed networking is one of the commonly used networking technologies at present, and can improve the reliability of a network through a switching between a main link and a backup link when a link fails. In a normal condition, the traffic passes through the main link, when the main link fails, the traffic is switched to the backup link for protection, so as to improve the reliability of network transmission in performance.

Figure 1:
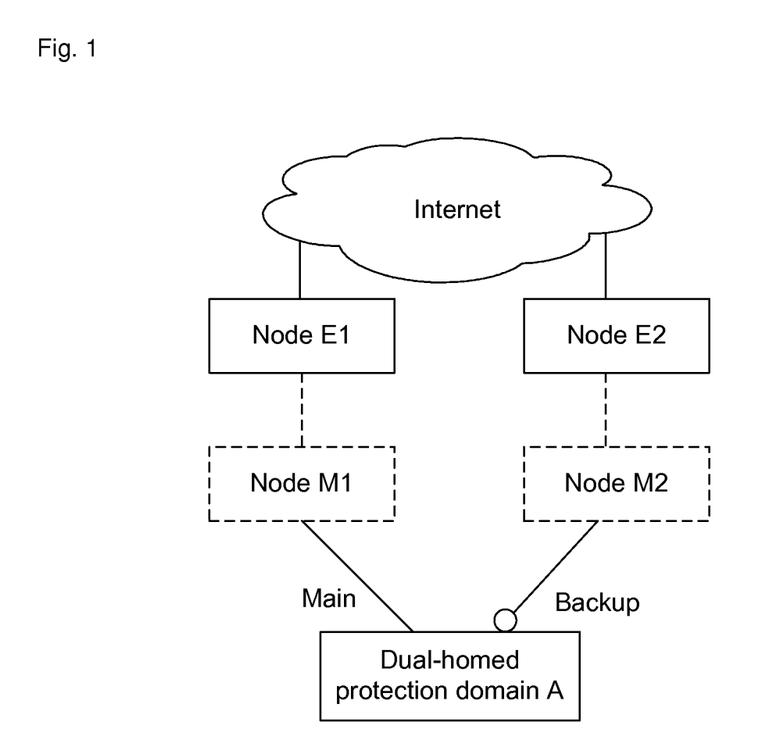
FIG. 1 shows a schematic diagram illustrating an Ethernet dual-homed networking mode in the prior art.

FIG. 1 shows a schematic diagram illustrating an Ethernet dual-homed networking mode in the prior art, a dual-homed protection domain A shown in FIG. 1 is a region configured with an Ethernet dual-homed connection protection protocol, which may be a node or a plurality of nodes. The dual-homed protection domain A provides two links upward, i.e., a main link and a backup link which access Internet in a dual-homed mode through a plurality of nodes (at least two nodes: E1 and E2). If the dual-homed protection domain A configured with the dual-homed connection protection protocol detects a failure of a link or node which is directly connected with the dual-homed protection domain A, the dual-homed protection domain A switches the traffic on the failure link to the backup link by protection switching so as to improve the robustness of the network; for example, when the main link fails, the traffic on the main link is switched to the backup link. Wherein, as shown in FIG. 1, the link between the dual-homed protection domain A and a node M1 is called a main link, the link between the dual-homed protection domain A and a node M2 is called a backup link, the dual-homed protection domain A→the node M1→the node E1→the Internet is called a path, the path in which the main link is located is called a main path, and the path in which the backup link is located is called a backup path. The small circle drawn at one end of the backup link shown in FIG. 1 indicates that in the normal condition the backup link is blocked and the traffic does not pass through the backup link.

However, when a node or link on an upper layer fails, the dual-homed protection domain A cannot perceive it; for example, when a failure occurs in the link between the M1 and the E1 or the link between the E1 and the Internet, the main path from the dual-homed protection domain A to the Internet via the M1 and the E1 is unavailable, a protection switching of the traffic should be realized as soon as possible, otherwise, loss of a large amount of data is caused and then the network performance is severely influenced. However, in the prior art, the dual-homed protection domain A cannot perceive the above condition in time, so that a fast protection switching cannot be realized.

SUMMARY

In view of the above problem, the main object of the disclosure is to provide a protection switching method and system for an Ethernet dual-homed link; when a failure occurs in a node or link between a dual-homed protection domain A and the Internet, a fast protection switching of the Ethernet dual-homed link can be realized.

Another object of the disclosure is to provide a protection switching method and system for an Ethernet dual-homed link; when a node or link between the dual-homed protection domain A and the Internet recovers from a failure, a fast backward switching of the Ethernet dual-homed link can be realized as required actually.

In order to realize the above objects, the technical solution of the disclosure is realized as follows.

A protection switching method for an Ethernet dual-homed link, comprising:

detecting, by a node on one path of a dual-homed link, that a failure occurs in a link or node which is directly connected with the node per se;

transmitting continuously a plurality of SF messages outwards through a non-failed port on a failure path by a non-master node when the node which detects the failure is the non-master node; and switching traffic on the failure path to an available path by the master node after the master node receives the SF messages.

The method may further comprise:

discarding the SF messages or triggering the flush of a Media Access Control (MAC) address by an intermediate node on the failure path after the intermediate node receives the SF messages; and discarding the SF messages or translating the SF messages into Flush messages used for notifying a Virtual Local Area Network (VLAN) in an Internet domain to perform the flush of the MAC address by an edge node on the failure path after the edge node receives the SF messages.

The method may further comprise:

when the node which detects the failure is a master node, determining whether the failure link or node is a link or node which is directly connected with a master port of the master node; if the failure link or node is a link or node which is directly connected with the master port of the master node, switching the traffic on the failure path to an available path by the master node; otherwise, recording failure state by the master node.

The method may further comprise:

detecting, by a node on one path of the dual-homed link, that a link or node which is directly connected with the node per se recovers from a failure;

transmitting, by a non-master node, a plurality of NR) messages outwards continuously through a non-failed port on a path which recovers from the failure when the node which detects the failure recovery is the non-master node; and determining whether the master node works in a reverse mode by the master node after the master node receives the NR messages, if yes, switching the traffic back to the path which recovers from the failure; otherwise, recording failure recovery state.

The method may further comprise: if the node which detects the failure recovery is a master node, and if the link or node which recovers from the failure is a link or node which is directly connected with the master port of the master node and if the master node works in a reverse mode, switching the traffic back to the path which recovers from the failure; otherwise, recording failure recovery state.

A protection switching method for an Ethernet dual-homed link comprising:

detecting, by a node on one path of a dual-homed link, that a link or node which is directly connected with the node per se recovers from a failure;

transmitting, by a non-master node, a plurality of NR messages outwards continuously through a non-failed port on a path which recovers from the failure when the node which detects the failure recovery is the non-master node; and determining whether the master node works in a reverse mode by the master node after the master node receives the NR messages, if yes, switching traffic back to the path which recovers from the failure; otherwise, recording failure recovery state.

The method may further comprise:

discarding the NR messages by an intermediate node or an edge node on the path which recovers from the failure after the intermediate node or edge node receives the NR messages.

The method may further comprise: if the node which detects the failure recovery is a master node, and if the link or node which recovers from the failure is a link or node which is directly connected with a master port of the master node and if the master node works in a reverse mode, switching the traffic back to the path which recovers from the failure; otherwise, recording failure recovery state.

A protection switching system for an Ethernet dual-homed link comprises a master node and a non-master node, wherein the non-master node is arranged to transmit a plurality of SF messages outwards continuously through a non-failed port on a failure path after detecting on one path of a dual-homed link that a failure occurs in a link or node which is directly connected with the non-master node per se; and the master node is arranged to switch traffic on the failure path to an available path after receiving the SF messages.

When the non-master node is an intermediate node which does not detect the failure, the non-master node is arranged to discard the SF messages or triggering the flush of an MAC address after receiving the SF messages on the failure path; and when the non-master node is an edge node which does not detect the failure, the non-master node is arranged to discard the SF messages or translating the SF messages into Flush messages used for notifying a VLAN in an Internet domain to perform the flush of an MAC address after receiving the SF messages on the failure path.

The master node may be further arranged to determine whether the failure link or node is a link or node which is directly connected with a master port of the master node after detecting on one path of the dual-homed link that a failure occurs in a link or node which is directly connected with the master node per se, if the failure link or node is a link or node which is directly connected with the master port of the master node, switching the traffic on the failure path to an available path; otherwise, recording failure state.

The non-master node may be further arranged to transmit a plurality of NR messages outwards continuously through a non-failed port on a path which recovers from a failure after detecting on one path of the dual-homed link that the link or node which is directly connected with the non-master node per se recovers from the failure; and the master node may be further arranged to determine whether the master node works in a reverse mode after receiving the NR messages, if yes, switch the traffic back to the path which recovers from the failure; otherwise, record failure recovery state.

The master node may be further arranged to determine whether the link or node which recovers from the failure is a link or node which is directly connected with the master port of the master node after detecting on one path of the dual-homed link that the link or node which is directly connected with the master node per se recovers from the failure, if the link or node which recovers from the failure is a link or node which is directly connected with the master port of the master node and if the master node works in a reverse mode, switch the traffic back to the path which recovers from the failure; otherwise, record failure recovery state.

A protection switching system for an Ethernet dual-homed comprises a master node and a non-master node, wherein the non-master node is arranged to transmit a plurality of NR messages outwards continuously through a non-failed port on a path which recovers from a failure after detecting on one path of a dual-homed link that a link or node which is directly connected with the non-master node per se recovers from a failure; and the master node is arranged to determine whether the master node works in a reverse mode after receiving the NR messages, if yes, switch traffic back to the path which recovers from the failure; otherwise, record failure recovery state.

When the non-master node is an intermediate node or an edge node which does not detect a failure recovery, the non-master node may be arranged to discard the NR messages after receiving the NR messages on the path which recovers from the failure.

The master node may be further arranged to determine, after detecting on one path of the dual-homed link that a link or node which is directly connected with the master node per se recovers from the failure, whether the link or node which recovers from the failure is a link or node which is directly connected with a master port of the master node, if the link or node which recovers from the failure is a link or node which is directly connected with the master port of the master node and if the master node works in a reverse mode, switch the traffic back to the path which recovers from the failure; otherwise, record failure recovery state.

It can be seen from the above technical solution that, in the disclosure, SF messages are sent by a node which is directly connected with the failure link or node, making the master node be capable of finding the failure condition of an upper link in time, so that fast protection switching of an Ethernet dual-homed link can be realized; moreover, in the disclosure, NR messages are sent by a node which is directly connected with the link or node which recovers from the failure, making the master node be capable of finding the failure recovery condition of an upper link in time, so that backward switching can be performed as required actually.

DETAILED DESCRIPTION

Technical terms referred in the disclosure are defined below before the disclosure is illustrated in detail.

As used herein "failure state protocol message (SF)" refers to a protocol message (frame) sent by a node which detects that a failure occurs, used for notifying a failure occurrence event.

As used herein "no request protocol message (NR)" refers to a protocol message (frame) sent by a node which detects that a failure recover occurs, used for notifying a failure recovery event.

As used herein "master node" refers to a main decider in a dual-homed protection domain; wherein the master node in the dual-homed network has two ports, namely a master port and a slave port; the link directly connected with the slave port is a protection link and usually is also called a slave link or backup link; when links of the dual-homed network are in normal condition, the slave port of the master node blocks data forwarding function to prevent data stream from being transmitted through the slave link; and when a failure occurs in the dual-homed network and the port corresponding to the failure link is not a slave port of the master node, the slave port of the master node opens the data forwarding function.

In addition, the node referred in the disclosure mainly refers to the layer 2 switching equipment.

Figure 2:
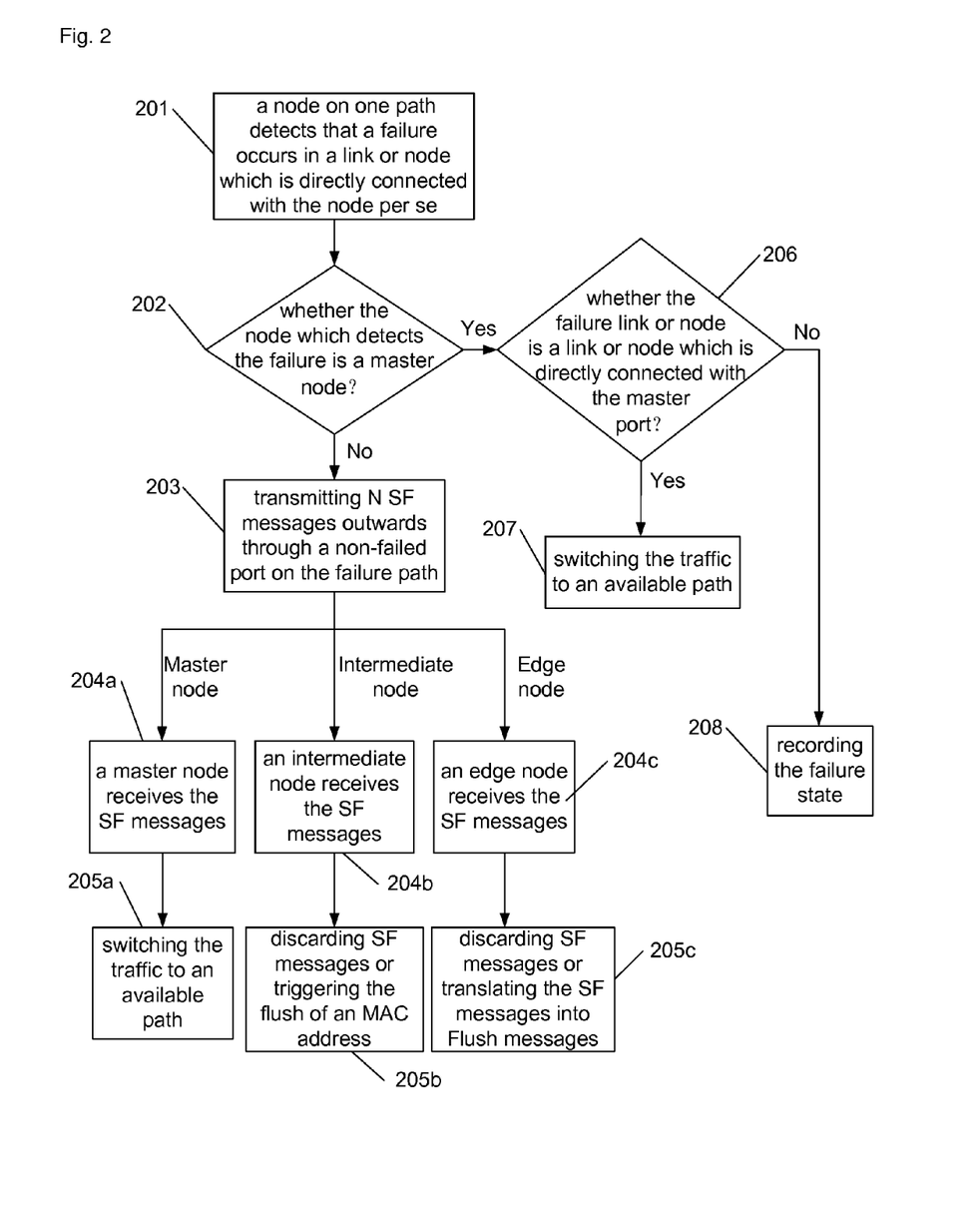
FIG. 2 shows a flowchart illustrating a protection switching method for an Ethernet dual-homed link when a failure occurs according to the disclosure.

FIG. 2 shows a flowchart illustrating a protection switching method for an Ethernet dual-homed link when a failure occurs according to the disclosure; as shown in FIG. 2, when a failure occurs, the protection switching method for an Ethernet dual-homed link provided by the disclosure comprises the following steps.

Step 201: a node on one path of the dual-homed link detects that a failure occurs in a link or node which is directly connected with the node per se;

in which, the path refers to the main path;

moreover, the process on how to detect a failure is not the focus of the disclosure, no further description is needed here.

Step 202: it is determined whether the node which detects the failure is a master node, if yes, step 206 is executed; otherwise, step 203 is executed.

Step 203: the node which detects the failure continuously transmits SF messages outwards quickly through a non-failed port in the failure path, mainly in order to notify the master node in the dual-homed protection domain to execute a protection switching program quickly, wherein the number of the SF messages is N.

Preferably, the number of the SF messages is defaulted to be three; here, the interval time of the three SF messages is very short and is counted by millisecond; three SF messages are transmitted continuously with a main purpose of preventing the loss of SF messages; furthermore, the millisecond interval of the SF messages does not cause the master node to repeat switching.

Step 204a to step 205a: after receiving the SF messages, the master node starts the protection switching program immediately, opens the slave port blocked previously and switches traffic on the failure path to an available path, the current flow is ended.

Step 204b to step 205b: after receiving the SF messages, an intermediate node on the failure path can directly discard the SF messages and perform no processing, or can also trigger the flush of an MAC address, the current flow is ended.

Step 204c to step 205c: after receiving the SF messages, an edge node on the failure path can directly discard the SF messages and perform no processing, or can also translate the SF messages into Flush messages used for notifying a Virtual Local Area Network (VLAN) related to an Internet domain to perform the flush of an MAC address according to a flushing policy, the current flow is ended.

Here, the non-master nodes except for the master node are divided into edge nodes and intermediate nodes, wherein the edge nodes refer to the nodes accessing the Internet, for example, E1 and E2 as shown in FIG. 1, and the intermediate nodes refer to the nodes except for the master node and the edge nodes, for example, M1 and M2 as shown in FIG. 1.

Step 206: after detecting that a failure occurs in the link or node which is directly connected with the master node per se, the master node determines whether the failure link or node is the link or node which is directly connected with the master port, if yes, step 207 is executed; otherwise, step 208 is executed.

Step 207: the master node directly starts the protection switching program, opens the slave port blocked previously and switches the traffic on the failure path to an available path, the current flow is ended.

Here, after the master node detects the failure, the process whether to transmit the SF messages or Flush messages used for refreshing on the slave port is not mandatory and can depend on flush requirement.

Step 208: the master node only records the failure state and does not perform other operations.

Similarly, after the master node detects the failure, the process whether to transmit SF messages or Flush messages used for refreshing on the master port is not mandatory and can depend on flush requirement.

It should be noted here that, when the traffic is transmitted on one path of the dual-homed link, the path is called the main path and the other blocked path is called the backup path; therefore, when a failure occurs in a link or node in the main path and the traffic is switched to the backup path, then the backup path becomes the main path, correspondingly, the backup link becomes the main link; similarly, the slave port connected with the backup link becomes the master port. It can be seen from the above analysis that, the main link and the backup link are not fixed but exchange roles with each other as the traffic is transmitted on different paths.

The protection switching method for the Ethernet dual-homed link as shown in FIG. 2 can further comprise that:

a node on one path of the dual-homed link detects that the link or node which is directly connected with the node per se recovers from the failure;

when the node which detects the failure recovery is a non-master node, the non-master node continuously transmits NR messages outwards through a non-failed port on a path which recovers from the failure, wherein the number of the NR messages is N;

after receiving the NR messages, the master node determines whether it works in a reverse mode, if yes, the master node switches the traffic back to the path which recovers from the failure; otherwise, the master node records the failure recovery state;

when the node which detects the failure recovery is a master node, it is determined whether the link or node which recovers from the failure is a link or node which is directly connected with the master port of the master node;

if yes, it is determined whether the master node works in a reverse mode, if yes, the master node switches the traffic back to the path which recovers from the failure; otherwise, the master node records the failure recovery state;

if no, the master node records the failure recovery state.

It can be seen from the above description that, the protection switching method for the Ethernet dual-homed link as shown in FIG. 2 not only can realize a fast protection switching of an Ethernet dual-homed link when a failure occurs, but also can realize a fast backward switching of the Ethernet dual-homed link as actually required in the condition of the failure recovery.

Figure 3:
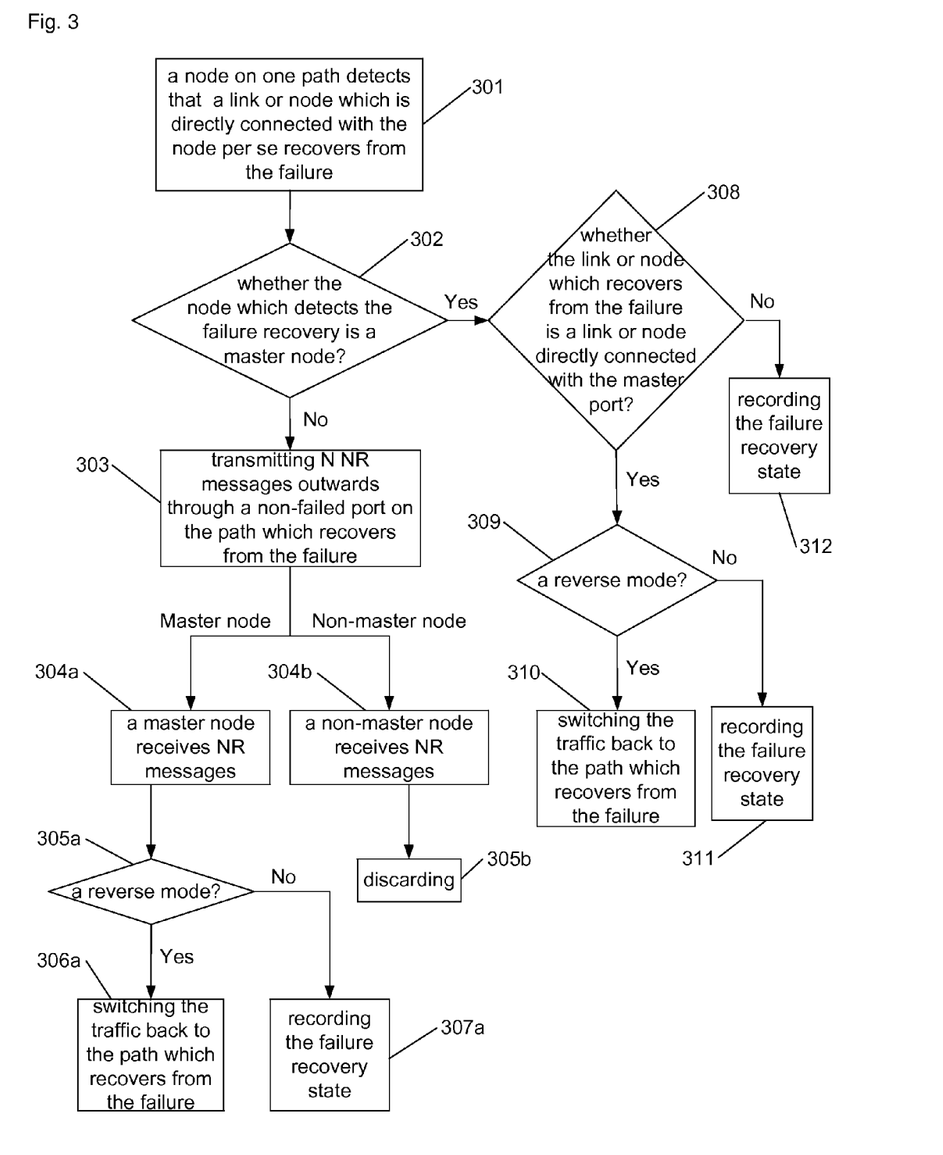
FIG. 3 shows a flowchart illustrating a protection switching method for an Ethernet dual-homed link when a recovery from a failure occurs according to the disclosure.

FIG. 3 shows a flowchart illustrating a protection switching method for an Ethernet dual-homed link when a failure recovery occurs according to the disclosure; as shown in FIG. 3, when a failure recovery occurs, the protection switching method for an Ethernet dual-homed link provided by the disclosure comprises the following steps.

Step 301: a node on one path of the dual-homed link detects that the link or node which is directly connected with the node per se recovers from the failure;

in which, the path refers to the main path in which a failure occurred previously.

Step 302: it is determined whether the node which detects the failure recovery is a master node, if yes, step 308 is executed; otherwise, step 303 is executed.

Step 303: the node which detects the failure recovery continuously transmits NR messages outwards quickly through a non-failed port on the path which recovers from the failure, to notify the failure recovery condition, wherein the number of the NR messages is N.

Preferably, the number of the NR messages is defaulted to be three.

Step 304a to step 305a: after receiving the NR messages, the master node determines whether it works in a reverse mode, if yes, step 306a is executed; otherwise, step 307a is executed;

wherein, the reverse mode refers to a work mode in which the traffic is switched back to the path which recovers from the failure if the failure path recovers from the failure.

Step 306a: the master node triggers a backward switching operation and switches the traffic back to the path which recovers from the failure, the current flow is ended.

Step 307a: the master node only records the failure recovery state and does not perform other processing, the current flow is ended.

Step 304b to step 305b: other nodes in the path which recovers from the failure, such as the intermediate nodes or edge nodes, directly discard the NR messages and perform no processing after receiving the NR messages, the current flow is ended.

Step 308: after detecting that the link or node which is directly connected with the master node per se recovers from the failure, the master node determines whether the link or node which recovers from the failure is the link or node which is directly connected with the master port, if yes, step 309 is executed; otherwise, step 312 is executed.

Step 309 to step 311: it is determined whether the master node works in a reverse mode, if yes, the master node triggers the backward switching operation and switches the traffic back to the path which recovers from the failure; otherwise, the master node only records the failure recovery state and does not perform other processing, the current flow is ended.

Step 312: when the link or node which recovers from the failure is the link or node which is directly connected with the slave port, the master node only records the failure recovery state and does not perform other processing.

The technical solution of the disclosure will be described in detail through several specific embodiments.

Embodiment 1

Figure 4:
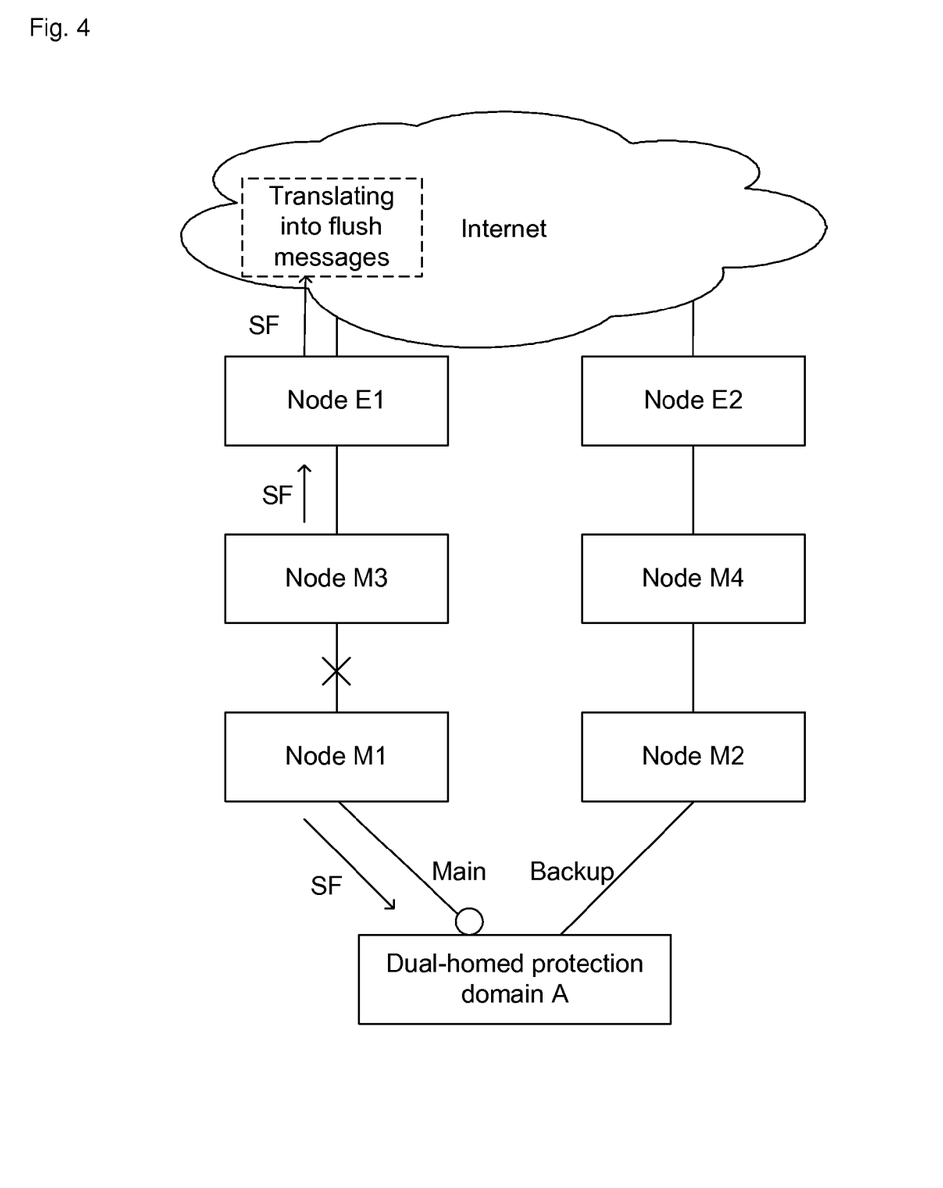
FIG. 4 shows a schematic diagram illustrating the condition that a failure occurs in a common link according to Embodiment 1 of the disclosure.

FIG. 4 shows the condition that a failure occurs in a common link according to Embodiment 1 of the disclosure.

A dual-homed protection domain A accesses an Internet region in a dual-homed mode through two paths, namely a path M1-M3-E1 and a path M2-M4-E2. In a normal condition, in order to prevent the occurrence of a loop, the master node in the dual-homed protection domain A blocks the backup link between the master node and an intermediate node M2; then the traffic is accessed to the Internet through a path A-M1-M3-E1; as shown in FIG. 4, when a failure occurs in the link between the intermediate nodes M1 and M3, after detecting a failure, intermediate nodes M1 and M3 immediately continuously transmit N (3 by default) SF messages outwards through a non-failed port on the main path quickly, wherein the path for the intermediate node M1 to transmit the SF messages is a path M1→the dual-homed protection domain A; the path for the intermediate node M3 to transmit the SF messages is a path M3→E1. After receiving the SF messages, the master node in the dual-homed protection domain A immediately starts a protection switching program, blocks the port (shown as the small circle in FIG. 4) corresponding to the main path and switches the traffic to the backup path, i.e., A-M2-M4-E2, so as to realize a fast perception of an upper-layer link failure and a fast protection switching. After receiving the SF messages, the intermediate nodes on the main path directly discard the SF messages or trigger the flush of an MAC address. After receiving the SF messages, the edge node E1 directly discards the SF messages or translates the SF messages into the Flush message used for notifying the VLAN related to the Internet domain to perform the flush of the MAC address.

Embodiment 2

Figure 5A:
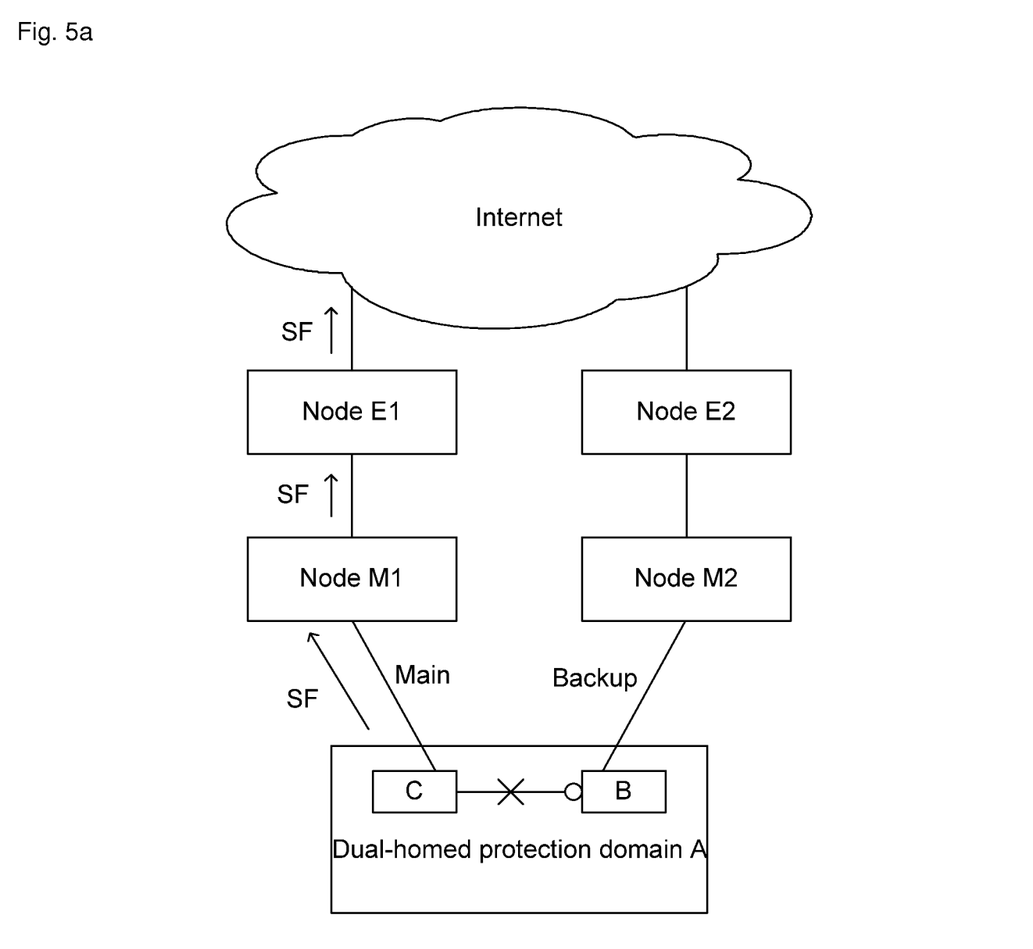
FIG. 5a shows a schematic diagram illustrating the condition that a failure occurs in a link which is directly connected with the master port of a master node B according to Embodiment 2 of the disclosure.
Figure 5B:
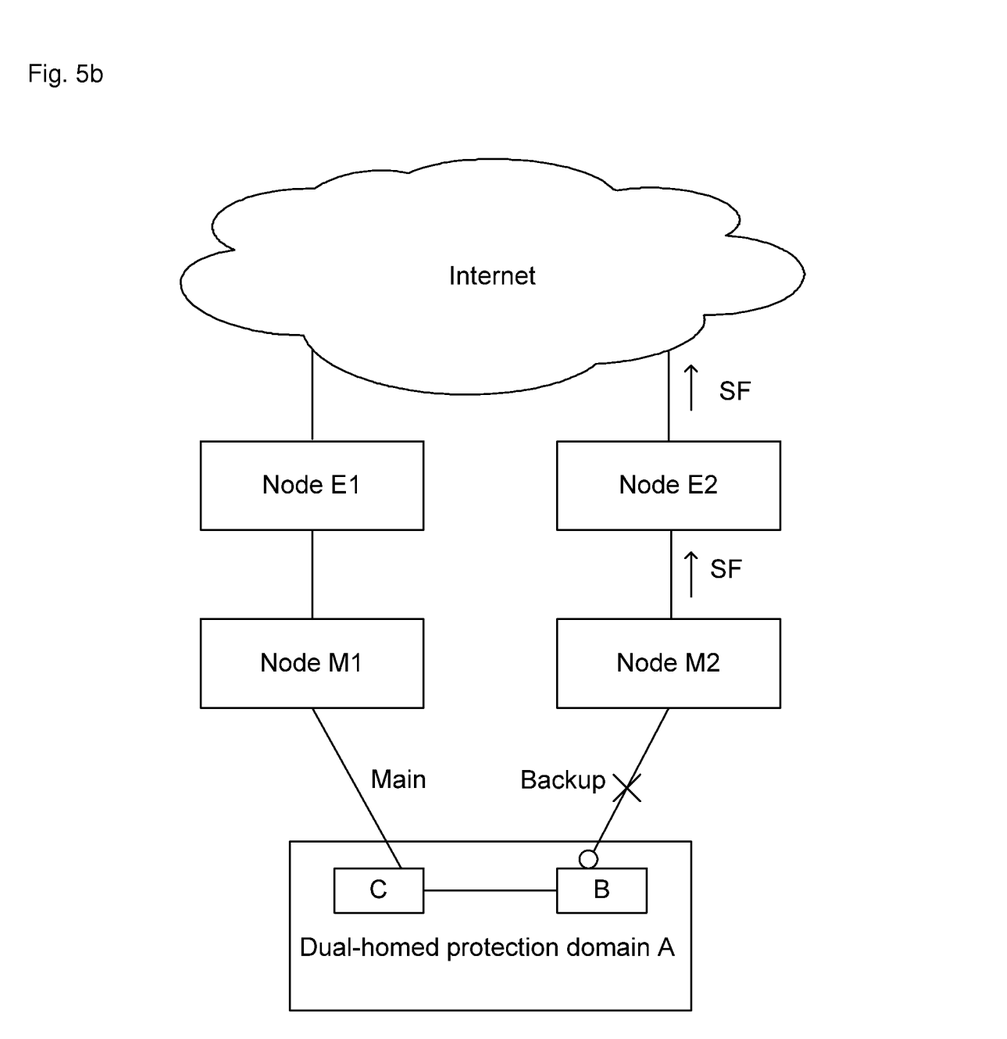
FIG. 5b shows a schematic diagram illustrating the condition that a failure occurs in a link which is directly connected with a slave port of the master node B according to Embodiment 2 of the disclosure.

In the embodiment, a node B is a master node. A dual-homed protection domain A accesses an Internet region in a dual-homed mode through two paths, namely a path M1-E1 and a path M2-E2. In a normal condition, the master node B in the dual-homed protection domain A blocks the backup link between the master node B and an intermediate node M2; and the traffic is accessed to the Internet through a path A(B-C)-M1-E1.

FIG. 5a shows the condition that a failure occurs in a link which is directly connected with the master port of the master node B. As shown in FIG. 5a, when detecting that a failure occurs in the link which is directly connected with the master port of the master node B, i.e., the link between the master node B and an intermediate node C, the master node B directly starts a protection switching program, blocks the master port (shown as the small circle in FIG. 5a) corresponding to the failure link and simultaneously opens the slave port, and switches the traffic to a path A(B)-M2-E2. After the master node B detects a failure, whether to transmit SF messages or translate the SF messages into Flush messages on the slave port depends on a flush requirement. Besides, after detecting a failure, the intermediate node C in the dual-homed protection domain A continuously transmits N (3 by default) SF messages outwards quickly through a non-failed port on the path; after receiving the SF messages, an intermediate node M1 and an edge node E1 can directly discard the SF messages or trigger the flush of an MAC address.

FIG. 5b shows the condition that a failure occurs in a link which is directly connected with a slave port of the master node B. As shown in FIG. 5b, when detecting that a failure occurs in the link which is directly connected with the slave port of the master node B, i.e., the link between the master node B and the intermediate node M2, the master node B only records the failure state and does not perform other operations; after detecting a failure, the intermediate node M2 transmits N (3 by default) SF messages outwards quickly through a non-failed port on the path; after receiving the SF messages, the edge node E2 directly discards the SF messages.

Embodiment 3

Figure 6:
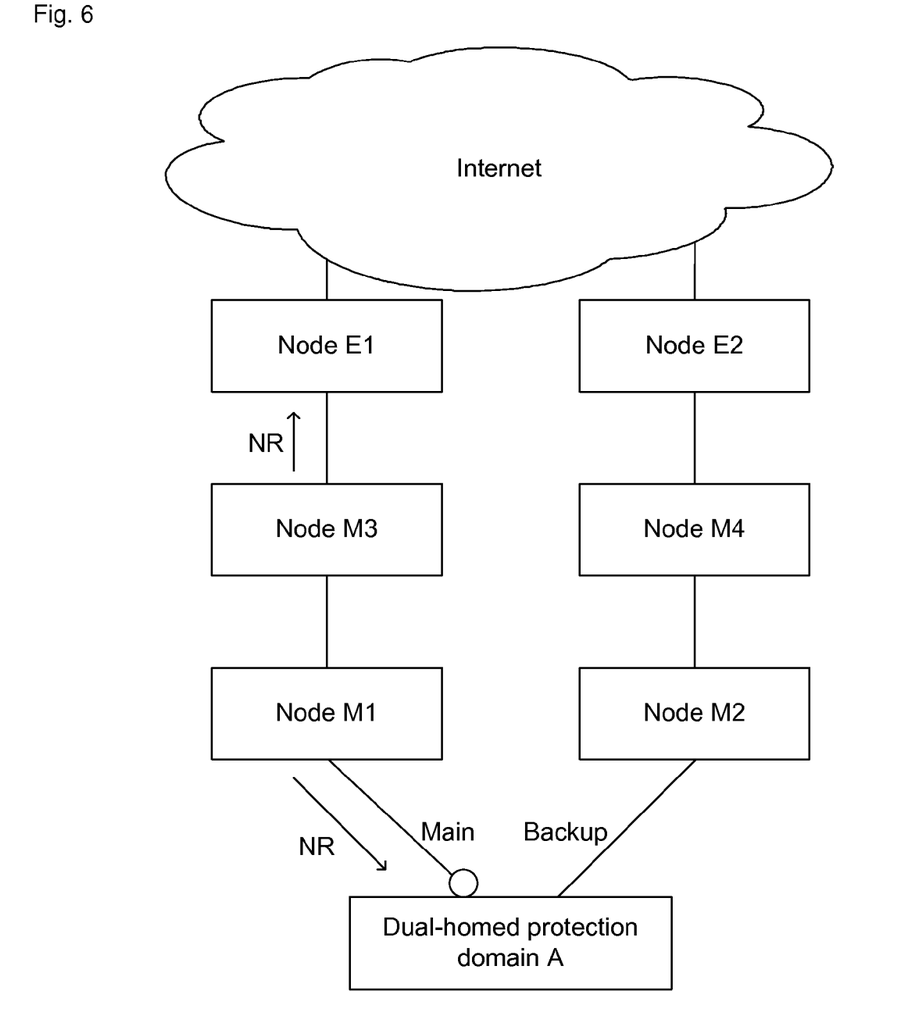
FIG. 6 shows a schematic diagram illustrating the condition that a common link recovers from a failure according to Embodiment 3 of the disclosure.

FIG. 6 shows the condition that a common link recovers from a failure according to Embodiment 3 of the disclosure; wherein the Embodiment 3 corresponds to the Embodiment 1 shown in FIG. 4.

When detecting that the link between the intermediate nodes M1 and M3 recovers from the failure, N (3 by default) NR messages are continuously transmitted outwards quickly through a non-failed port on the path which recovers from failure to notify the failure recovery event, wherein the path for the intermediate node M1 to transmit the NR messages is the path M1→the dual-homed protection domain A and the path for the intermediate node M3 to transmit the NR messages is the path M3→E1. After receiving the NR messages, the master node in the dual-homed protection domain A determines whether the master node works in a reverse mode, if yes, the master node triggers the backward switching operation and switches the traffic back to the path which recovers from the failure; otherwise, the master node only records the failure recovery state and does not perform other operations; shown as the small circle in FIG. 6, the master port of the master node in the dual-homed protection domain A is stilled blocked; after receiving the NR messages, other nodes directly discard the NR messages and perform no processing.

Embodiment 4

The Embodiment 4 corresponds to the Embodiment 2 shown in FIG. 5.

Figure 7A:
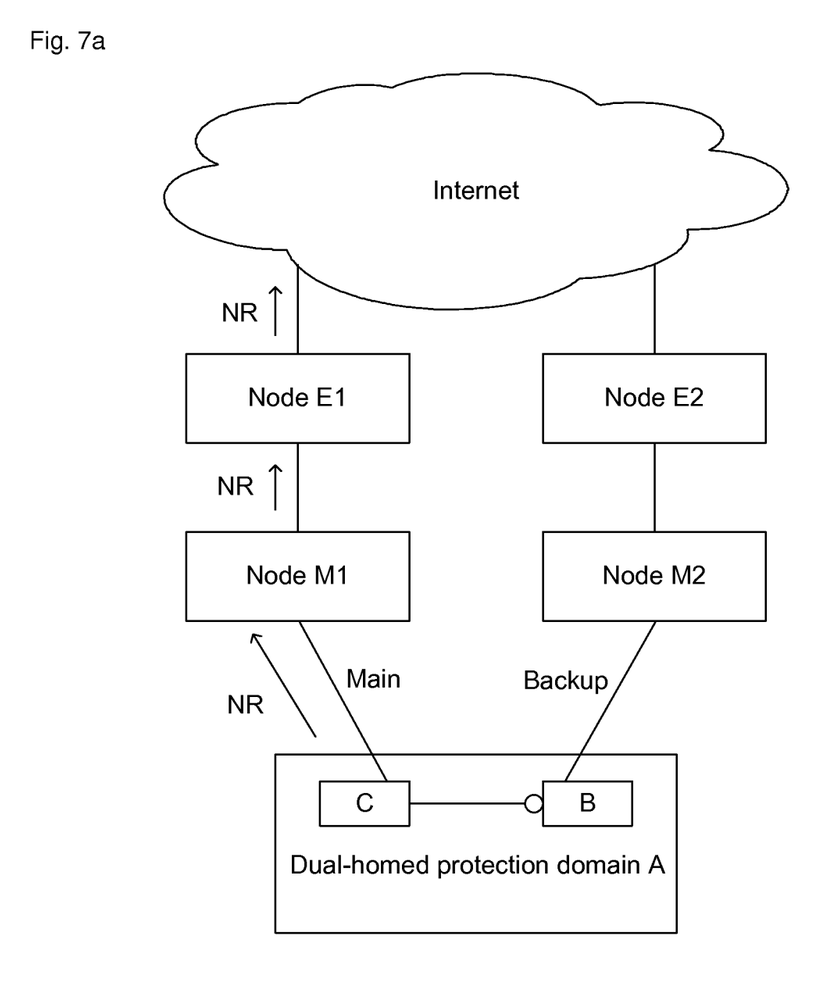
FIG. 7a shows a schematic diagram illustrating the condition that a link which is directly connected with the master port of the master node B recovers from a failure according to Embodiment 2 of the disclosure.

FIG. 7a shows the condition that a link which is directly connected with the master port of the master node B recovers from a failure. As shown in FIG. 7a, when detecting that the link which is directly connected with the master port of the master node B, i.e., the link between the master node B and the intermediate node C, recovers from the failure, the master node B determines whether it works in a reverse mode, if yes, the master node B triggers the backward switching operation and switches the traffic back to the path which just recovered from the failure; otherwise, the master node B only records the failure recovery state and does not perform other operations; as shown in FIG. 7a, the master port of the master node B is still blocked. After detecting a failure recovery, the intermediate node C in the dual-homed protection domain A continuously transmits N (3 by default) NR messages outwards quickly through a non-failed port on the path; after receiving the NR messages, the intermediate node M1 and the edge node E1 directly discard the NR messages and perform no processing.

Figure 7B:
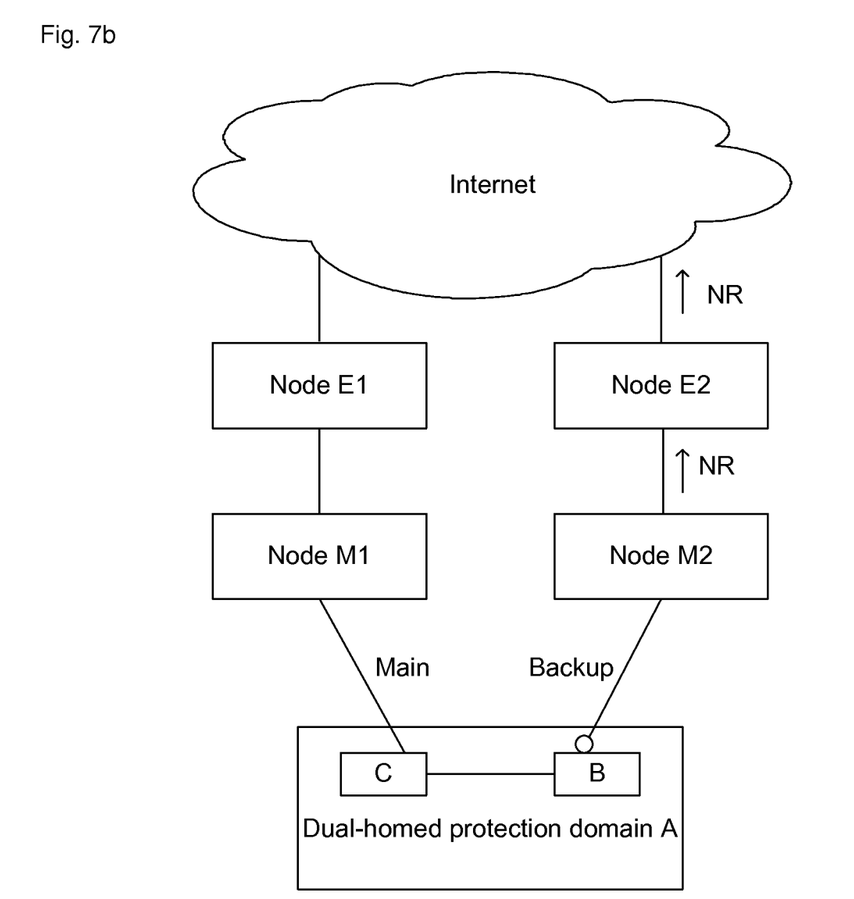
FIG. 7b shows a schematic diagram illustrating the condition that a link which is directly connected with a slave port of the master node B recovers from a failure according to Embodiment 2 of the disclosure.

FIG. 7b shows the condition that a link which is directly connected with a slave port of the master node B recovers from a failure. As shown in FIG. 7b, when detecting that the link which is directly connected with the slave port of the master node B, i.e., the link between the master node B and the intermediate node M2, recovers from the failure, the master node B only records the failure recovery state and does not perform other operations. After detecting the failure recovery, the intermediate node M2 continuously transmits N (3 by default) NR messages outwards quickly through a non-failed port on the path; after receiving the NR messages, the edge node E2 directly discards the NR messages and performs no processing.

Embodiment 5

Figure 8:
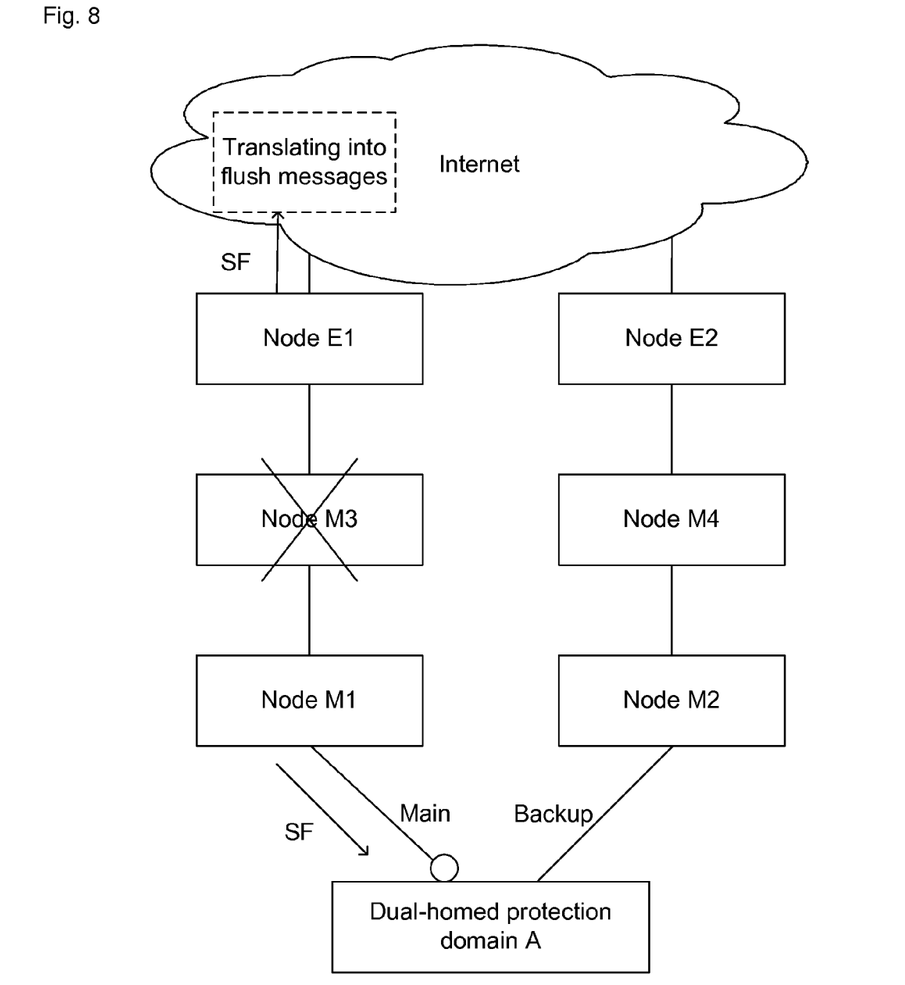
FIG. 8 shows a schematic diagram illustrating the condition that a failure occurs in a node according to Embodiment 5 of the disclosure.

FIG. 8 shows the condition that a failure occurs in a node.

As shown in FIG. 8, when a failure occurs in a node M3, the nodes M1 and E1 adjacent to the node M3 continuously transmit N (3 by default) SF messages outwards quickly through a non-failed port on the path after detecting the failure; after receiving the SF messages, the master node starts a protection switching program; and other nodes directly discard the SF messages and perform no processing after receiving the SF messages.

The processing flows in the condition that a failure occurs in a node and the condition that a node recovers from the failure are similar to the Embodiment 1 shown in FIG. 4 and the Embodiment 3 shown in FIG. 6 respectively, equivalently to the condition that a failure occurs in the path between the node M1 and the node E1 if the node M3 does not exist, therefore, no further description for the Embodiment 5 is needed here.

Figure 9:
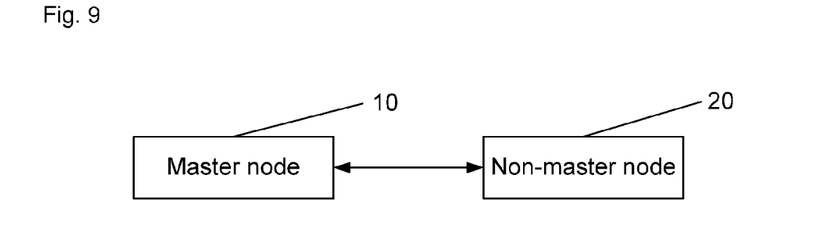
FIG. 9 shows a structure diagram of a protection switching system for an Ethernet dual-homed link according to the disclosure.

In order to realize the protection switching method for an Ethernet dual-homed link in the condition that a failure occurs, the disclosure provides a protection switching system for an Ethernet dual-homed link correspondingly; as shown in FIG. 9, the system comprises a master node 10 and a non-master node 20, wherein the non-master node 20 is used for continuously transmitting SF messages outwards through a non-failed port on a failure path after detecting on one path of a dual-homed link that a failure occurs in a link or node which is directly connected with the non-master node 20 per se, wherein the number of the SF messages is N; and the master node 10 is used for switching traffic on the failure path to an available path after receiving the SF messages.

Further, when the non-master node is an intermediate node or edge node which does not detect a failure, wherein the intermediate node is used for discarding the SF messages or triggering the flush of an MAC address after receiving the SF messages on the failure path; and the edge node is used for discarding the SF messages or translating the SF messages into Flush messages used for notifying an VLAN in the Internet domain to perform the flush of an MAC address after receiving the SF messages on the failure path.

In particular, the master node 10 is further used for determine whether the failure link or node is a link or node which is directly connected with the master port of the master node 10 after detecting on one path of the dual-homed link that a failure occurs in a link or node which is directly connected with the master node 10 per se, if yes, switching the traffic on the failure path to an available path; otherwise, recording the failure state.

In the protection switching system for an Ethernet dual-homed link, the non-master node is further used for continuously transmitting NR messages outwards through a non-failed port on the path which recovers from the failure after detecting on one path of the dual-homed link that the link or node which is directly connected with the non-master node per se recovers from the failure, wherein the number of the NR messages is N; and the master node is further used for determining whether it works in a reverse mode after receiving the NR messages, if yes, switching the traffic back to the path which recovers from the failure; otherwise, recording the failure recovery state.

In particular, the master node is further used for determining whether the link or node which recovers from the failure is a link or node which is directly connected with the master port of the master node after detecting on one path of the dual-homed link that the link or node which is directly connected with the master node per se recovers from the failure, if yes, determining whether the master node works in a reverse mode, if yes, switching the traffic back to the path which recovers from the failure; otherwise, recording the failure recovery state;

if no, recording the failure recovery state.

The protection switching system for the Ethernet dual-homed link not only can realize a fast protection switching of the Ethernet dual-homed link when a failure occurs, but also can realize a fast backward switching of the Ethernet dual-homed link as required actually when a failure recovery occurs.

In order to realize the above protection switching method for the Ethernet dual-homed link in the condition of the failure recovery, the disclosure provides a protection switching system for the Ethernet dual-homed link correspondingly, wherein the system comprises a master node and a non-master node, wherein the non-master node is further used for continuously transmitting NR messages outwards through a non-failed port on the path which recovers from the failure after detecting on one path of the dual-homed link that a link or node which is directly connected with the non-master node per se recovers from the failure; and the master node is further used for determining whether it works in a reverse mode after receiving the NR messages, if yes, switching traffic back to the path which recovers from the failure; otherwise, recording the failure recovery state.

Further, when the non-master node is an intermediate node or an edge node which does not detect the failure recovery, the non-master node or edge node is used for discarding the NR messages after receiving the NR messages on the path which recovers from the failure.

In particular, the master node is further used for determining whether the link or node which recovers from the failure is a link or node which is directly connected with the master port of the master node after detecting on one path of the dual-homed link that the link or node which is directly connected with the master node per se recovers from the failure, if yes, determining whether the master node works in a reverse mode, if yes, switching the traffic back to the path which recovers from the failure; otherwise, recording the failure recovery state;

if no, recording the failure recovery state.

The above are only the preferred embodiments of the disclosure and are not intended to limit the scope of protection of the disclosure.

The invention claimed is:

1. A protection switching method for an Ethernet dual-homed link, comprising:
   detecting, by a node on one path of a dual-homed link, that a failure occurs in a link or node which is directly connected with the node per se;
   transmitting continuously a plurality of SF messages outwards through a non-failed port on a failure path by a non-master node when the node which detects the failure is the non-master node; and
   switching traffic on the failure path to an available path by the master node after the master node receives the SF messages,
   wherein the non-master node is located between the master node and the Ethernet.

2. The method according to claim 1, further comprising:
   discarding the SF messages or triggering the flush of an MAC address by an intermediate node on the failure path after the intermediate node receives the SF messages; and
   discarding the SF messages or translating the SF messages into Flush messages used for notifying a VLAN in an Internet domain to perform the flush of the MAC address by an edge node on the failure path after the edge node receives the SF messages.

3. The method according to claim 2, further comprising:
   when the node which detects the failure is a master node, determining whether the failure link or node is a link or node which is directly connected with a master port of the master node; if the failure link or node is a link or node which is directly connected with the master port of the master node, switching the traffic on the failure path to an available path by the master node; otherwise, recording failure state by the master node.

4. The method according to claim 1, further comprising:
   when the node which detects the failure is a master node, determining whether the failure link or node is a link or node which is directly connected with a master port of the master node; if the failure link or node is a link or node which is directly connected with the master port of the master node, switching the traffic on the failure path to an available path by the master node; otherwise, recording failure state by the master node.

5. The method according to claim 1, further comprising:
   detecting, by a node on one path of the dual-homed link, that a link or node which is directly connected with the node per se recovers from a failure;
   transmitting, by a non-master node, a plurality of NR messages outwards continuously through a non-failed port on a path which recovers from the failure when the node which detects the failure recovery is the non-master node; and
   determining whether the master node works in a reverse mode by the master node after the master node receives the NR messages, if yes, switching the traffic back to the path which recovers from the failure; otherwise, recording failure recovery state.

6. The method according to claim 5, further comprising: if the node which detects the failure recovery is a master node and if the link or node which recovers from the failure is a link or node which is directly connected with the master port of the master node and if the master node works in a reverse mode, switching the traffic back to the path which recovers from the failure; otherwise, recording failure recovery state.

7. A protection switching method for an Ethernet dual-homed link, comprising:

detecting, by a node on one path of a dual-homed link, that a link or node which is directly connected with the node per se recovers from a failure;

transmitting, by a non-master node, a plurality of NR messages outwards continuously through a non-failed port on a path which recovers from the failure when the node which detects the failure recovery is the non-master node; and determining whether the master node works in a reverse mode by the master node after the master node receives the NR messages, if yes, switching traffic back to the path which recovers from the failure by the master node; otherwise, recording failure recovery state by the master node, wherein the non-master node is located between the master node and the Ethernet.

8. The method according to claim 7, further comprising:
discarding the NR messages by an intermediate node or an edge node on the path which recovers from the failure after the intermediate node or edge node receives the NR messages.

9. The method according to claim 8, further comprising: if the node which detects the failure recovery is a master node, and if the link or node which recovers from the failure is a link or node which is directly connected with a master port of the master node and if the master node works in a reverse mode, switching the traffic back to the path which recovers from the failure; otherwise, recording failure recovery state.

10. The method according to claim 7, further comprising: if the node which detects the failure recovery is a master node, and if the link or node which recovers from the failure is a link or node which is directly connected with a master port of the master node and if the master node works in a reverse mode, switching the traffic back to the path which recovers from the failure; otherwise, recording failure recovery state.

11. A protection switching system for an Ethernet dual-homed link, comprising a master node and a non-master node, wherein
the non-master node located between the master node and the Ethernet, is arranged to transmit a plurality of SF messages outwards continuously through a non-failed port on a failure path after detecting on one path of a dual-homed link that a failure occurs in a link or node which is directly connected with the non-master node per se; and
the master node is arranged to switch traffic on the failure path to an available path after receiving the SF messages.

12. The system according to claim 11, wherein
when the non-master node is an intermediate node which does not detect the failure, the non-master node is arranged to discard the SF messages or triggering the flush of an MAC address after receiving the SF messages on the failure path; and
when the non-master node is an edge node which does not detect the failure, the non-master node is arranged to discard the SF messages or translating the SF messages into Flush messages used for notifying a VLAN in an Internet domain to perform the flush of an MAC address after receiving the SF messages on the failure path.

13. The system according to claim 12, wherein
the master node is further arranged to determine whether the failure link or node is a link or node which is directly connected with a master port of the master node after detecting on one path of the dual-homed link that a failure occurs in a link or node which is directly connected with the master node per se, if the failure link or node is a link or node which is directly connected with the master port of the master node, switching the traffic on the failure path to an available path; otherwise, recording failure state.

14. The system according to claim 11, wherein
the master node is further arranged to determine whether the failure link or node is a link or node which is directly connected with a master port of the master node after detecting on one path of the dual-homed link that a failure occurs in a link or node which is directly connected with the master node per se, if the failure link or node is a link or node which is directly connected with the master port of the master node, switching the traffic on the failure path to an available path; otherwise, recording failure state.

15. The system according to claim 11, wherein
the non-master node is further arranged to transmit a plurality of NR messages outwards continuously through a non-failed port on a path which recovers from a failure after detecting on one path of the dual-homed link that the link or node which is directly connected with the non-master node per se recovers from a failure; and
the master node is further arranged to determine whether the master node works in a reverse mode after receiving the NR messages, if yes, switch the traffic back to the path which recovers from the failure; otherwise, record failure recovery state.

16. The system according to claim 15, wherein
the master node is further arranged to determine whether the link or node which recovers from a failure is a link or node which is directly connected with the master port of the master node after detecting on one path of the dual-homed link that the link or node which is directly connected with the master node per se recovers from the failure, if the link or node which recovers from the failure is a link or node which is directly connected with the master port of the master node and if the master node works in a reverse mode, switch the traffic back to the path which recovers from the failure; otherwise, record failure recovery state.

17. A protection switching system for an Ethernet dual-homed link, comprising a master node and a non-master node, wherein
the non-master node located between the master node and the Ethernet, is arranged to transmit a plurality of NR messages outwards continuously through a non-failed port on a path which recovers from a failure after detecting on one path of a dual-homed link that a link or node which is directly connected with the non-master node per se recovers from a failure; and
the master node is arranged to determine whether the master node works in a reverse mode after receiving the NR messages, if yes, switch traffic back to the path which recovers from the failure, otherwise, record failure recovery state.

18. The system according to claim 17, wherein
when the non-master node is an intermediate node or an edge node which does not detect a failure recovery, the non-master node is arranged to discard the NR messages after receiving the NR messages on the path which recovers from the failure.

19. The system according to claim 18, wherein
the master node is further arranged to determine, after detecting on one path of the dual-homed link that a link or node which is directly connected with the master node per se recovers from a failure, whether the link or node which recovers from the failure is a link or node which is directly connected with a master port of the master node, if the link or node which recovers from the failure is a link or node which is directly connected with the master port of the master node and if the master node works in a reverse mode, switch the traffic back to the path which recovers from the failure; otherwise, record failure recovery state.

20. The system according to claim 17, wherein
the master node is further arranged to determine, after detecting on one path of the dual-homed link that a link or node which is directly connected with the master node per se recovers from a failure, whether the link or node which recovers from the failure is a link or node which is directly connected with a master port of the master node, if the link or node which recovers from the failure is a link or node which is directly connected with the master port of the master node and if the master node works in a reverse mode, switch the traffic back to the path which recovers from the failure; otherwise, record failure recovery state.

\* \* \* \* \*